Nov. 27, 1928.
L. BARNETT
1,692,806
ELECTRIC OUTLET BOX SUPPORT
Filed May 7, 1927
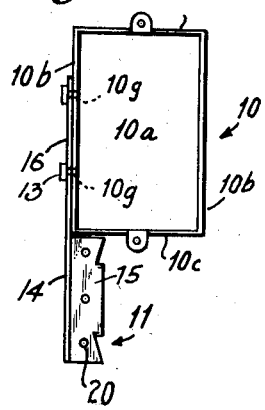
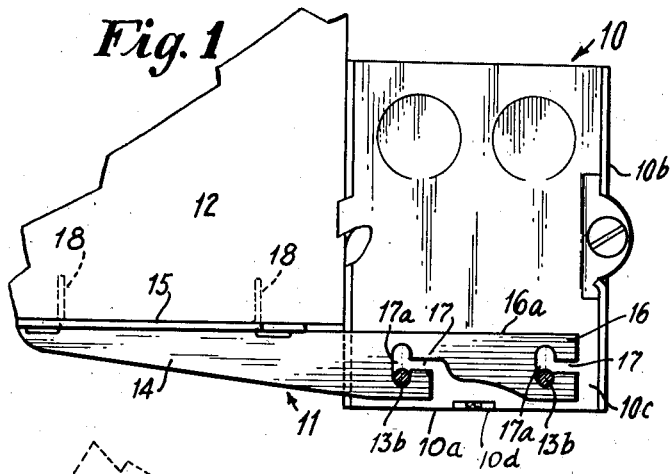
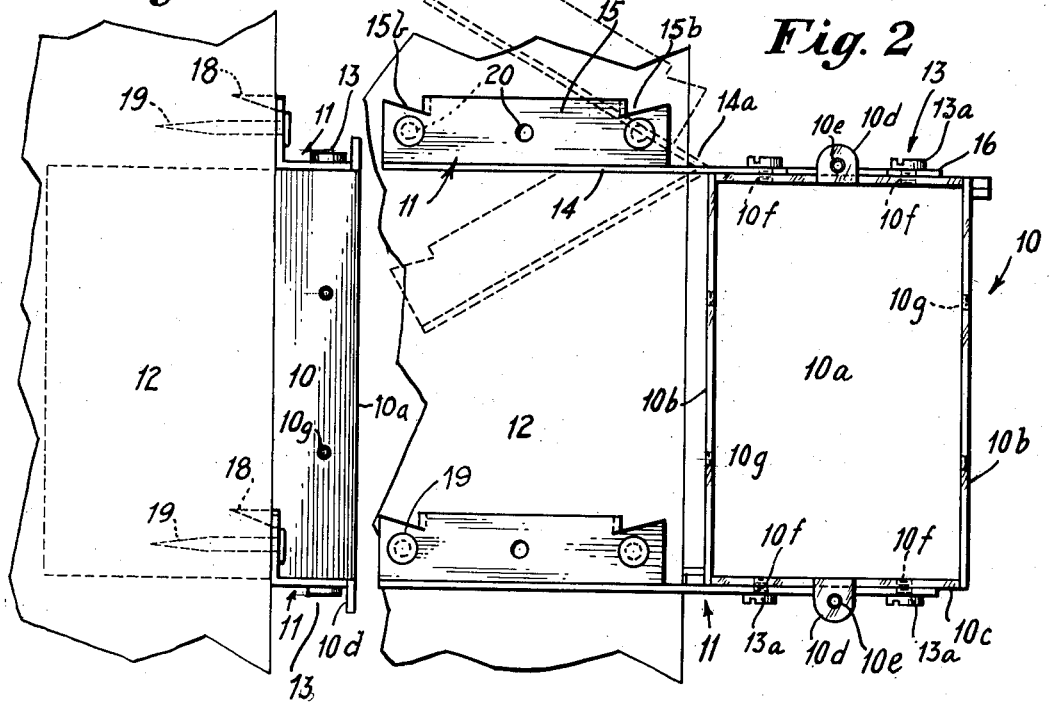
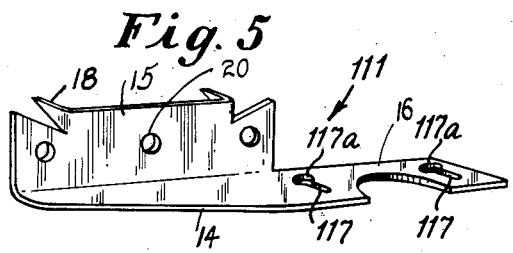
Louis Barnett.
INVENTOR Patented Nov. 27, 1928.

1,692,806

UNITED STATES PATENT OFFICE.

LOUIS BARNETT, OF BROOKLYN, NEW YORK, ASSIGNOR TO STANDARD FLEXIBLE ELECTRIC CABLE CORPORATION, OF BROOKLYN, NEW YORK, A CORPORATION OF NEW YORK.

ELECTRIC OUTLET-BOX SUPPORT.

Application filed May 7, 1927. Serial No. 189,466.

This invention relates to devices for supporting outlet boxes, and the like, in electric wiring installations for building construction and for other similar purposes.

One object of the invention is to provide an improved supporting device of the character described, which is adapted to be interchangeably secured to any side of a standard type of electric switch or junction box for readily mounting the latter in a desired position to a building structure whereby the installation is facilitated at a minimum labor cost.

Another object of the invention is to provide an electric outlet box supporting device of simplified construction having its parts arranged to facilitate handling the erection of the wiring installation under both conventional and unusual building requirements, which shall be cheap to manufacture, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Figs. 1, 2 and 3 are top, front and side elevational views, respectively, of a switch or junction box mounted by means of supporting devices embodying the invention.

Fig. 4 is a front elevational view of a switch or junction box showing an improved supporting device secured to a long side of a standard junction or switch box.

Fig. 5 is a perspective view of an improved outlet box support provided with buttonhole type of slots adapted to engage the fastening screws threaded into the sides of the box.

Referring in detail to the drawing, 10 denotes an electric outlet box mounted by supporting devices 11 embodying the invention on a vertically extending building structure member 12.

The box 10 may be of any standard construction and as here shown is of the switch or junction type having a rectangular shaped open side 10ª which is bound by long and short side walls 10ᵇ and 10ᶜ, respectively. Each of the short side walls has outwardly extending therefrom, the usual lug 10ᵈ which is provided with a threaded hole 10ᵉ for engaging with a screw fastened closure or flush plate to extend over said open side 10ª in the well understood manner (not shown). The box side walls 10ᵇ and 10ᶜ are each provided with a pair of threaded holes 10ᶠ and 10ᵍ, respectively, for receiving the screws 13 for fastening the box to the supporting devices 11.

The device 11 preferably is made of sheet metal and comprises a strip member 14 having an integral base 15 extending less than the entire length of the strip to form an angle structure. The strip portion 16 extending beyond the angle structure is provided with suitable slots 17 spaced to receive the fastening screws 13. Said slots are preferably made to engage with the screws 13 without requiring the removal of the latter from thread holes 10ᵉ. To this end, as shown in Fig. 1, said slots are T-shaped and are open-ended so that they may be readily slipped under the screw head 13ª and the screw shank 13ᵇ positioned in the slot portion 17ª to prevent accidental displacement in the well understood manner.

The integral base 15 has one or more edge portions sheared and bent as at 15ᵇ to form prongs 18 for piercing the structure member 12. Said prongs serve to retain the supporting device 11 in a desired position preparatory to driving nails 19 through suitable spaced holes 20 provided in said base 15 for rigidly mounting the box 10 in position as shown in Figs. 1, 2 and 3.

If the angle structure of the device 11 including the base 15 should pass in alignment with an obstruction (not shown) extending from the surface of structure member 12, the angle structure is bent to either side of such obstruction at a mid-section 14ª of the strip member as shown in dotted lines in Fig. 2.

It should be noted that because of the novel construction of the supporting device 11, it is adapted to be interchangeably secured to any side of the box 10, that is, identical devices 11 may be attached along opposite side walls of the box thus eliminating the necessity of using supporting devices in pairs (a left and a right) for mounting a box 10. The parts of the device 11 are so proportioned that it can be also applied to the long side walls 10ᶜ as well as the short side walls 11ᵈ. See Fig. 4.

In Fig. 5, a device 111 of a modified construction of supporting device embodying the invention is shown which is similar to the device 11 described above with the exception that instead of T-shaped slots 17 there is provided buttonhole slots 117, the large end 117ᵃ thereof being adapted to fit over the screw heads 13ᵃ for securing the device 111 to the box 10 without removing the screw 13 in the well understood manner.

The box 10 as shown in Fig. 3 is retained to project from the structure member 12. If it is desired to bring the open side 10ᵃ of the box into substantially the same plane of the member 12, the devices 11 are secured to the box 10 with the edges 16ᵃ of the strip portions 16 placed adjacent the lugs 10ᵈ as will be clearly understood from Fig. 1.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A device of the character described for attaching an outlet box to a stud, comprising a member having an angled portion, a flange of said portion formed with means for attaching the device to the face of the stud, the other flange of said angled portion being extended to form a flat strip, said strip being provided with means for attachment to the outlet box.

2. A device of the character described for attaching to a stud an outlet box having fastening screws, comprising a member having an angled portion, a flange of said angled portion formed with means for attaching the device to the face of a stud, a flat extension on the other flange of the angled portion having spaced openings for engaging said outlet box screws, said extension being bendable for throwing the latter out of alignment with respect to the angled portion as and for the purpose described and specified.

3. A supporting device for outlet boxes of the character described, comprising a straight elongated angled member having one flange of the angled structure removed for a portion of the length, the flange opposite the removed portion constituting a flat strip and provided with means for attachment to an outlet box, one flange of the other portion of said member being provided with means for attachment to the face of a stud.

4. A supporting device for outlet boxes of the character described, comprising a straight elongated angled member having one flange of the angled structure removed for a portion of the length, the flange opposite the removed portion constituting a flat strip and provided with means for attachment to an outlet box, one flange of the other portion of said member being provided with means for attachment to the face of a stud, said flat strip being bendable for throwing opposite ends of said member out of alignment as and for the purpose described and specified.

In testimony whereof I affix my signature.

LOUIS BARNETT.